(12) United States Patent
Fattal et al.

(10) Patent No.: US 8,655,124 B2
(45) Date of Patent: Feb. 18, 2014

(54) DIELECTRIC WAVEGUIDE INTERSECTION WITH REDUCED LOSSES

(75) Inventors: David A. Fattal, Mountain View, CA (US); Jingjing Li, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 13/061,449

(22) PCT Filed: Sep. 4, 2008

(86) PCT No.: PCT/US2008/075176
§ 371 (c)(1),
(2), (4) Date: Feb. 28, 2011

(87) PCT Pub. No.: WO2010/027357
PCT Pub. Date: Mar. 11, 2010

(65) Prior Publication Data
US 2011/0194815 A1    Aug. 11, 2011

(51) Int. Cl.
G02B 6/26    (2006.01)
(52) U.S. Cl.
USPC ............... 385/31; 385/14; 385/15; 385/18; 385/27; 385/28; 385/29; 385/30
(58) Field of Classification Search
USPC .................. 385/14–15, 18, 27–29, 30–31
See application file for complete search history.

(56) References Cited

U.S. PATENT DOCUMENTS

| | | | |
|---|---|---|---|
| 4,728,167 A * | 3/1988 | Soref et al. .................. | 385/16 |
| 4,961,619 A | 10/1990 | Hernandez-Gil | |
| 5,039,988 A * | 8/1991 | Hong ............................ | 341/137 |
| 5,526,449 A | 6/1996 | Meade | |
| 5,825,952 A * | 10/1998 | Kawanishi et al. ............ | 385/47 |
| 6,198,860 B1 * | 3/2001 | Johnson et al. ................ | 385/28 |
| 6,526,193 B1 * | 2/2003 | He et al. ........................ | 385/16 |
| 6,684,008 B2 | 1/2004 | Young | |
| 6,934,446 B2 * | 8/2005 | Rasras ........................... | 385/39 |
| 6,990,257 B2 | 1/2006 | Gunn | |
| 2002/0126942 A1 * | 9/2002 | Evans ............................ | 385/14 |
| 2003/0063885 A1 | 4/2003 | Gunn, III | |
| 2005/0213873 A1 * | 9/2005 | Piede et al. .................... | 385/14 |
| 2008/0253713 A1 * | 10/2008 | Piede et al. .................... | 385/14 |

FOREIGN PATENT DOCUMENTS

| | | |
|---|---|---|
| JP | 61-073905 | 4/1986 |
| JP | 2000-056151 | 8/1998 |

OTHER PUBLICATIONS

Baba Toshihiko, et al. Si Photonic Wire Waveguides, IEICE Journal, Jun. 1, 2005, C, Electronics, J88-C(6), pp. 363-373.

Fukazawa et al., Low loss intersection of Si photonic wire waveguides, Japanese Journal of Applied Physics, vol. 43, No. 2 (Feb. 10, 2004), URL< http://www.dnj.ynu.ac.jplbabalablFukazawa%20Intersection.pdf>See Abstract: Figs. 1-2: pp. 646-647.

* cited by examiner

*Primary Examiner* — Ryan Lepisto
*Assistant Examiner* — Guy Anderson

(57) ABSTRACT

A waveguide intersection includes an input waveguide and an output waveguide; a crossing waveguide intersecting the input waveguide and the output waveguide to form an intersection; and a block that is optically joined to the intersection such that a guided mode is produced within the intersection. A method of reducing optical losses within a waveguide intersection includes increasing a cross-sectional height of an intersection such that optical energy passing through the intersection is laterally confined.

20 Claims, 3 Drawing Sheets

DIELECTRIC WAVEGUIDE INTERSECTION WITH REDUCED LOSSES

BACKGROUND

Light beams or optical signals are frequently used to transmit digital data. For example, optical signals can be used to transmit data between electronic components on a single circuit board, or between electronic components on nearby circuit boards. Increasingly, optical signals are being used to transmit data between sub-components within integrated circuits.

Optical signals can be routed using waveguides. Waveguides carry optical energy by imposing boundaries which control the expansion of the optical energy and guide it to a desired location. Optical waveguides are typically constructed of a dielectric material with a relatively high index of refraction which is surrounded by a material with a lower permittivity such as cladding or air. For example, ridge waveguides can be constructed to carry optical signals between sub-components within an integrated circuit. Typically, a ridge waveguide is an elongated structure with a rectangular or circular cross-section that optically connects a signal source to one or more detectors. The ridge waveguide can be made from a variety of materials that are at least partially transparent at a target optical wavelength or range of wavelengths.

The design and manufacture of integrated optical circuits is made much more complicated when waveguides have to cross each other. One possible approach to this issue is to route one of the crossing waveguides out of the plane of the circuit to pass over or under the other waveguide. However, adding such out-of-plane structure to the manufacture of the integrated optical circuit greatly increases the complexity and cost of manufacturing the integrated optical circuit. Additionally, turns or curves in the waveguide out of and back into the circuit plane may result in unwanted reflection or loss or signal strength.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
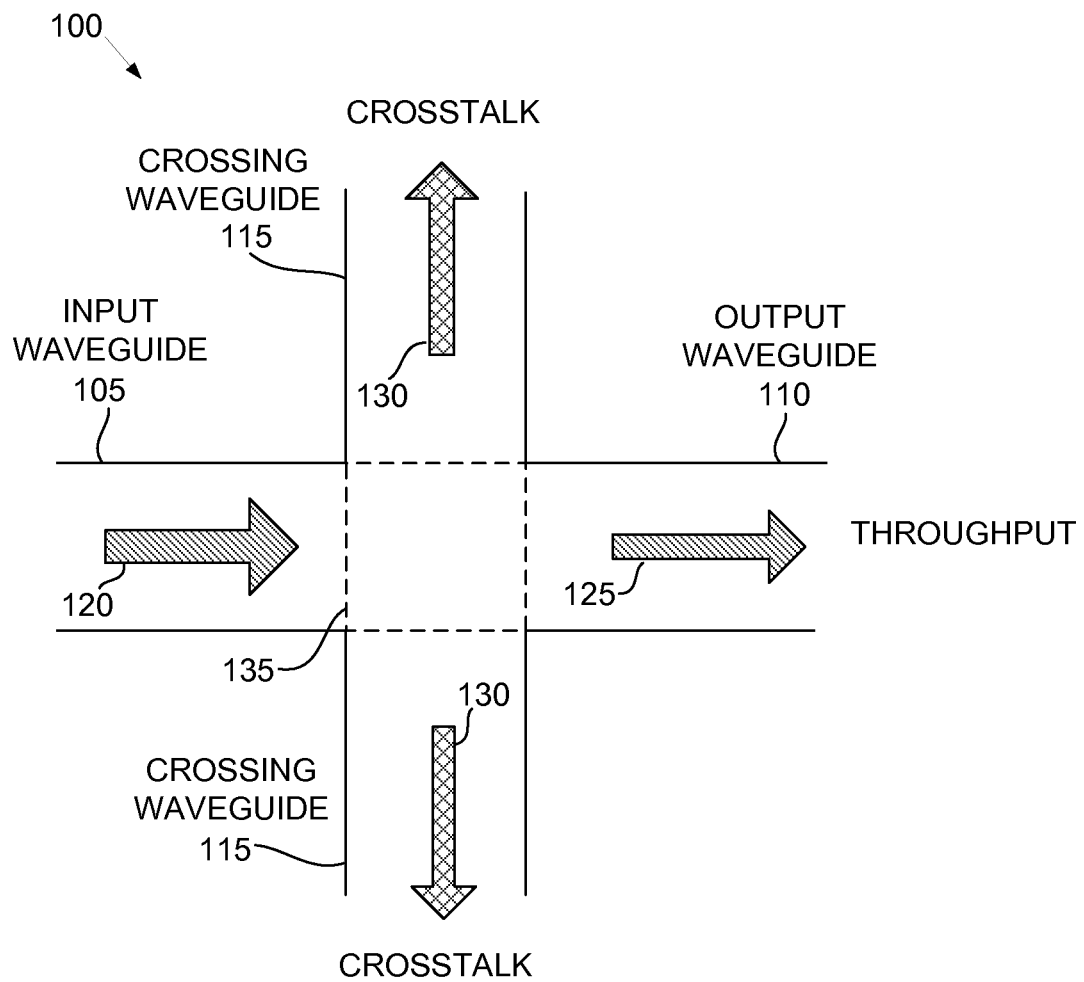
FIG. 1 is an illustrative diagram of a waveguide intersection which shows optical losses due to cross-talk at the intersection of an input waveguide and a crossing waveguide, according to one embodiment of principles described herein.

In constructing integrated optical circuits, space constraints and the desire to operate on multiple input waveguides are facilitated by waveguide intersections. Because of the difficulty in manufacturing out-of-plane curves and the radiation and reflection produced by the curves, waveguides may not physically cross over each other on different planes or layers but rather intersect in the same coplanar region. The present specification consequently describes structures and techniques that allow optical signals to move through physical intersections between waveguides without sacrificing signal integrity.

Typical applications where a large number of waveguide intersections are used include massively parallel photonic networks used to make interconnections between multi-core chip designs. As the density and number of interconnections in multi-core chip designs increase, electrical interconnections between the various cores become a factor limiting the performance of the system. By replacing the electrical interconnections with an on-chip waveguide network, the interconnection can provide superior speed, smaller footprint, and lower heat dissipation. As on-chip dielectric waveguides are more densely placed, waveguide intersections become more common and reducing signal cross-talk at these waveguide intersections becomes more important.

Another application where photonics networks are used is in optical switching networks. In an optical switching network, a large number of inputs are directed to as many outputs, and waveguide intersections are necessary in order for each input to connect to every output. In large switching architectures, losses associated with intersecting optical waveguides are of special concern because the loss will be a function of the number of waveguide intersections encountered in a particularly selected path, and therefore will vary with path.

As two or more waveguides cross, they create an intersection where the waveguide medium is used to transmit optical energy from two or more input waveguides into corresponding output waveguides. The waveguide intersections should be as efficient as possible at avoiding undesirable optical losses and cross-talk. Ideally, optical energy would enter the intersection from an input waveguide and pass through the intersection into the desired output waveguide without disruption or losses. However, the physical intersection of two or more waveguides typically creates a large variation in the effective index of refraction of the optical path. This discontinuity disturbs the incident guided mode and generally results in cross-talk, back reflections, and scattering into the open space.

Cross-talk is the leakage of optical energy into an unintended waveguide. One reason for cross-talk at waveguide intersections is the absence of lateral restrains to optical energy propagation in the intersection. The sidewalls of the input waveguide which previously served as a boundary defining the guided mode are absent in the intersection. Without these lateral restraints, the optical energy expands in the intersection and a portion of the optical energy escapes into the crossing waveguide. This dispersed optical energy may then contaminate other optical signals.

Back reflections occur where a portion of the optical energy reverses direction at an interface or discontinuity in the optical medium. As discussed above, the effective index of refraction changes suddenly at the entrance and exit of the intersection. This change in the effective index of refraction can cause back reflections which can result in a loss of output power and noise.

Scattering can occur when optical energy encounters rough surfaces, edges, or other imperfections and is diverted out of the optical waveguide. At an intersection, the optical energy is no longer contained within the input waveguide and expands, thereby increasing the interaction of the optical energy with the surrounding surfaces and increasing the potential for scattering.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

The principles disclosed herein will now be discussed with respect to illustrative systems and methods.

FIG. 1 is an illustrative diagram of a waveguide intersection (100). According to one illustrative embodiment, the waveguide intersection (100) is made up of an input waveguide (105), an output waveguide (110), and a crossing waveguide (115). The intersection (135) of the waveguides is outlined by a dotted box. Ideally, incident optical energy (120) travels through the input waveguide (105), passes straight through the intersection (135) without any losses, and into the output waveguide (110).

As described above, there are a number of reasons losses can occur at a waveguide intersection. For example, a portion of the incident optical energy (120) can escape into the crossing waveguide (115). This cross-talk energy (130) represents an undesirable loss of energy from the incident optical energy (120). The magnitude of the output energy (125) is reduced by the amount of energy which escapes as cross-talk energy (130). The cross-talk energy (130) is then superimposed on signals traveling through the crossing waveguide (115). This unintended signal can deteriorate the integrity of the signals traveling through the crossing waveguide (115), or cause malfunction of the circuit.

Figure 2:
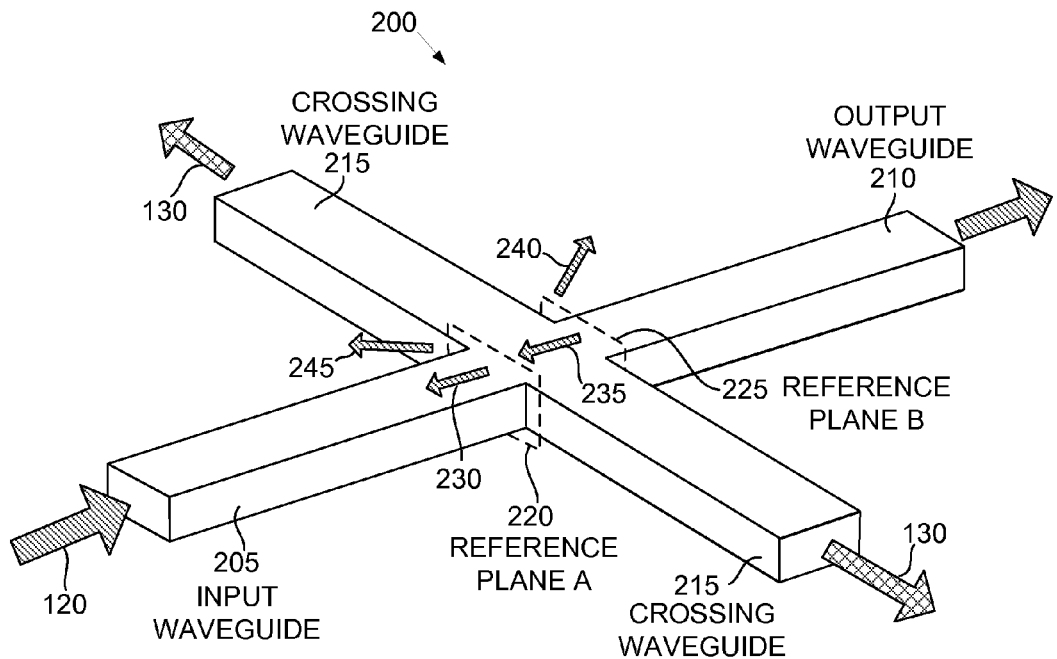
FIG. 2 is an illustrative three dimensional diagram of a ridge waveguide intersection which shows optical losses due to back reflections at the intersection of an input waveguide and a crossing waveguide, according to one embodiment of principles described herein.

FIG. 2 is an illustrative three dimensional diagram of a ridge waveguide intersection (200). The ridge waveguide intersection (200) is made up of an input waveguide (205), an output waveguide (210), and a crossing waveguide (215). As discussed above, ridge waveguides may be formed out of a variety of materials that are at least partially transparent at one or more target optical wavelengths. According to one illustrative embodiment, the ridge waveguides may be made out of silica deposited on a substrate and shaped using integrated circuit manufacturing techniques. By way of example and not limitation, a ridge waveguide may be constructed out of a number of glasses, silicon, silicon compounds, polymers, or other dielectric materials. In some embodiments, a ridge waveguide can be constructed using standard integrated circuit manufacturing techniques.

As described above, incident optical energy (120) passes through the input waveguide (205) toward the intersection. The mode shape of the incident optical energy (120) is influenced by the geometry and physical properties of the input waveguide and surrounding materials. These surrounding materials may include a substrate base, additional cladding layers, adjacent structures or coatings. Among other characteristics, the input waveguide (205) and surrounding materials dictate a mode shape and effective index of refraction for light traveling through the waveguide. The particular mode shape and effective index of refraction may be influenced by a variety of factors. By way of example and not limitation, these factors may include the geometry of the waveguide, temperature of the materials, the wavelength of the incident optical energy, the presence of various electromagnetic fields, etc. The input waveguide may be tuned to carry a specific wavelength of optical energy or range of wavelengths with minimal losses.

The energy carried in the incident optical mode is confined inside, and within the immediate vicinity of, the incident waveguide. The geometry of the waveguide and other physical constraints force the optical energy to assume one or more mode shapes while traveling through the waveguide. The term "mode shape" refers to the distribution of optical energy as it travels through a medium. When the optical energy reaches the intersection, the walls of the input waveguide that restrict the expansion of the optical energy in a lateral direction are absent. As noted above, it is then possible for the optical energy to couple into mode shapes that freely propagate in the lateral direction, resulting in a large amount of optical energy exiting the intersection through the crossing waveguide (215). As discussed above, this cross-talk energy (130) can have undesirable effects on the optical signals passed through the system. The cross-talk not only reduces the amplitude of the output signal, but also introduces unwanted signals that propagate through the crossing waveguides.

When incident optical energy (120) encounters discontinuities in its path, back reflections can occur. One such discontinuity can occur as the incident optical energy (120) crosses reference plane A (220) and enters the intersection of the waveguide intersection (200). The effective index of refraction of the medium suddenly changes when the previously confining walls of the input waveguide are interrupted by the intersection of the crossing waveguide (215). A back reflection A (230) can be generated at this transition.

Another transition occurs at reference plane B (225), as optical energy reenters a confining output waveguide. A similar back reflection B (235) can be generated at this point. According to one exemplary embodiment, the back reflections (230, 235) can be tuned so that they have similar amplitude and opposite phase. As the tuned back reflections (230, 235) travel back up the input waveguide (205), they will destructively interfere. This destructive interference cancels the back reflections and reduces noise in the optical signal and energy loss.

The back reflections (230, 235) can be tuned to have similar amplitude and opposite phase using a number of factors including, but not limited to: adjusting the width of the intersection, selecting the optical material, adjusting the geometry of the waveguide, and/or adjusting the geometry of surrounding structures.

When incident optical energy (120) encounters discontinuities in its path, scattering into open space can occur. In this process, the optical energy traveling along the waveguide in the form of a guided mode can be scattered out of the waveguide and into the surrounding medium. This scattered energy (240, 245) is an undesirable loss of optical signal. One such discontinuity can occur as the incident optical energy (120) crosses reference plane A (220) and enters the intersection of the waveguide intersection (200). Another transition occurs at reference plane B (225), as optical energy reenters a confining output waveguide. A similar scattering at plane B (235) can be generated at this point.

Figure 3:
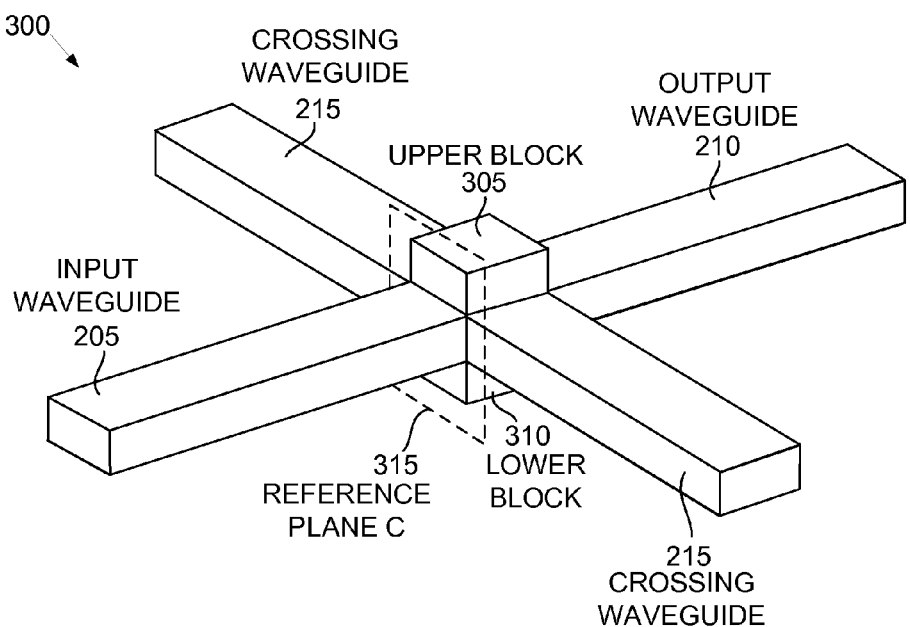
FIG. 3 is an illustrative diagram of a ridge waveguide intersection which shows the addition of an upper and lower dielectric block at the intersection of the input and crossing waveguides, according to one embodiment of principles described herein.

FIG. 3 is an illustrative diagram of a ridge waveguide intersection (300). In one embodiment, the width of the waveguides is between 10-200 nanometers and the thickness is between 5-100 nanometers. Additionally, the waveguides may intersect at a variety of angles. In the example illustrated in FIG. 3, the crossing waveguide (215) intersects the input and output waveguides (205, 210) at 90 degrees. In other embodiments, the intersection angle may range from acute angles of a few degrees to large obtuse angles.

According to one illustrative embodiment, one or more dielectric blocks (305, 310) are formed at the intersection of the input waveguide (205) and crossing waveguides (210). In FIG. 3, an upper block (305) is formed above the intersection and a lower block (310) is formed below the intersection. The existence of the upper and lower blocks (305, 310) produces a finite number of eigenmodes propagating in the direction of the incident guided mode. This limits the expansion of the optical energy in the lateral direction at the intersection. Further, the blocks (305, 310) can be configured to reduce back reflections in the intersection.

These blocks (305, 310) may be formed using the same processes as the waveguides and other components in an integrated optical circuit. According to one embodiment, a multilayer nano-imprint mask is used to form both the dielectric blocks and the crossed waveguides. The use of a multilayer nano-imprint lithography allows a three dimensional structure to be formed in a single operation. This provides for superior registration between the dielectric blocks and the crossed waveguides. In some embodiments, only one of the upper and lower blocks (305, 310) is formed. Using only one block can reduce the manufacturing complexity while still producing significant reduction in losses and in the cross-talk at the intersection.

The upper and lower blocks (305, 310) may be formed from a variety of materials with an index of refraction higher than that of the surrounding medium. According to one illustrative embodiment, the blocks (305, 310) are formed from the same material as the waveguide to simplify the fabrication process. In other embodiments, the block material may be selected to improve the optical characteristics of the waveguide intersection (300). By way of example and not limitation, a block material with a particular index of refraction may be selected to reduce the back reflections generated by the intersection.

In the illustrative diagram of FIG. 3, the geometry of the blocks (305, 310) is shown as a sharp edged rectangle which covers the entire intersection. A number of other geometries could be used. For example manufacturing constraints may dictate that the blocks (305, 310) have more rounded edges. Additionally, the blocks (305, 310) could have a smaller or larger footprint than the intersection. The thickness of the blocks can also be adjusted to accomplish the desired confinement of the optical energy. Thicker blocks result in greater confinement of the optical energy to the center of the intersection, while thinner blocks result in lesser confinement. According to one illustrative embodiment, the blocks (305, 310) have a thickness that is equal to or less than the thickness of the waveguides (205, 210, 215).

The upper and lower blocks (305, 310) are ideally merged into the waveguide such that the blocks become an integral part of the intersection. In one embodiment, the blocks and the waveguides are monolithic and formed in a single process. By eliminating the optical boundary between the blocks and the intersection, the blocks can more directly act on the optical energy passing through the intersection. Further, eliminating the optical boundary between the blocks and the intersection can eliminate undesirable reflections and scattering.

Figure 4:
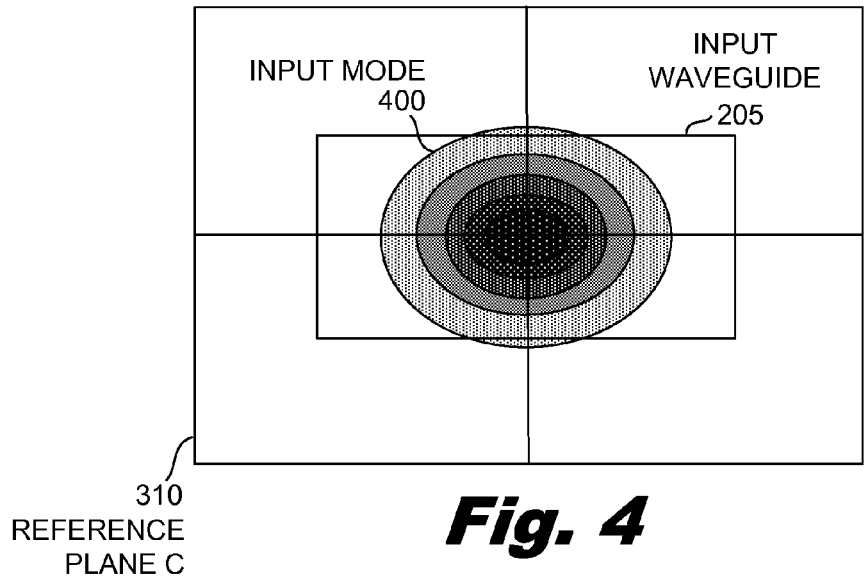
FIG. 4 is an illustrative diagram showing a guided optical mode in an input waveguide, according to one embodiment of principles described herein.

FIG. 4 is a cross-sectional diagram of the input waveguide (205) taken at the reference plane C (310) looking into the input waveguide (205). As discussed above, the input waveguide (205) and its surroundings provide boundaries and other conditions that define the mode shape of optical energy that passes through it. This input mode (400) is illustrated as a series of concentric ellipses. The density of optical flux is illustrated by the fill within the concentric ellipses, with darker fill indicating higher optical flux and lighter fill indicating lower optical flux.

As discussed above, the input mode (400) is produced by a combination of the characteristics of the input optical signal and by the physical constraints of the input waveguide and surrounding structures. In the illustration of FIG. 4, the majority of the optical flux is confined within the input waveguide (205), with the highest flux density at the center of the input waveguide (205). As shown by the outer ellipse, only small amounts of the optical energy are distributed outside of the waveguide (205).

Figure 5:
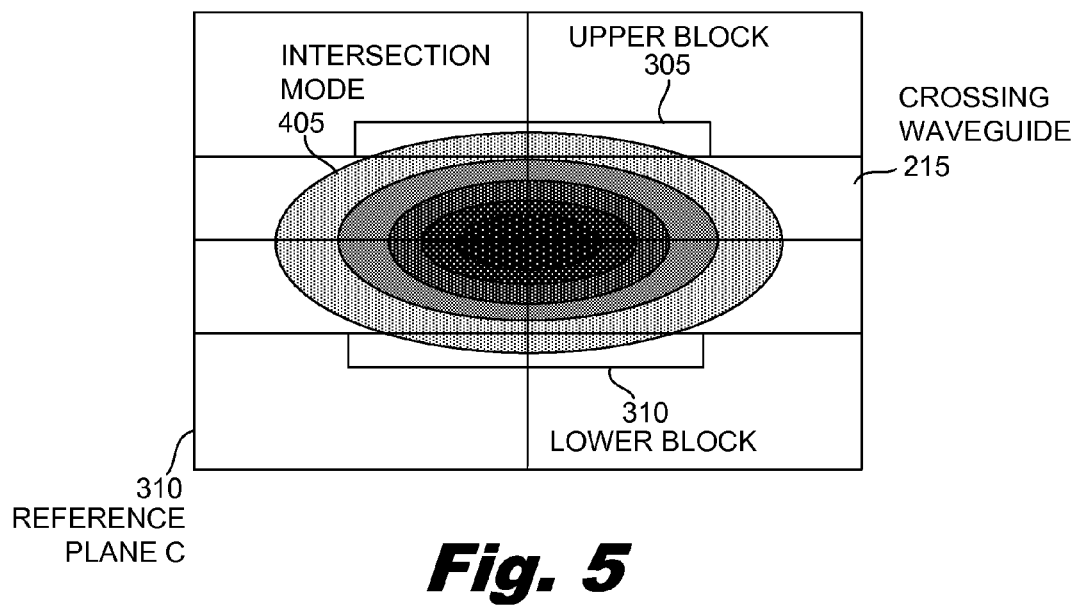
FIG. 5 is an illustrative diagram showing a guided optical mode traversing a crossing waveguide, according to one embodiment of principles described herein.

FIG. 5 is a cross-sectional diagram of the intersection taken at the reference plane (310) looking into the intersection. Cross-sections of the crossing waveguide (215), the upper block (305) and the lower block (310) are shown. In configurations where the upper and lower blocks (305, 310) are absent, the optical mode within the intersection would be unrestrained in the lateral direction. As discussed above, this could lead to significant cross-talk, reflections, scattering and other undesirable optical behavior.

The addition of the upper and lower blocks (305, 310) provides lateral restraints and results in a well-confined intersection mode (405) with the field concentrated in between the two blocks (305, 310). The intersection mode (405) becomes more tightly confined as the thickness of the two blocks (305, 310) increases. The existence of such a guided intersection mode (405) provides much better mode matching to the input mode (400) at the entering boundary and to the output mode at the exiting boundaries of the intersection.

Similar to the input mode (400) described above, the intersection mode (405) is illustrated as a series of concentric ellipses. The density of optical flux within the mode is illustrated by the fill within the concentric ellipses, with darker fill indicating higher optical flux and lighter fill indicating lower optical flux. When compared to the input mode (400), the intersection mode (405) has greater lateral spreading due to the smaller lateral boundaries. However, the intersection mode (405) confines the majority of the optical energy to the center of the intersection and restricts the amount of energy lost to cross-talk.

Additionally, the addition of an upper and/or lower block (305, 310) reduces the mismatch between the effective index of refraction across the intersection and the waveguides. Consequently, the magnitude of the back reflections is significantly reduced. According to one exemplary embodiment, an 85% reduction in cross-talk and a 90% reduction in back reflections was observed when upper and lower dielectric blocks were added to a waveguide intersection design. The back reflection can be further reduced by choosing the size of the crossing region to be a half effective wavelength of the guided mode.

Because of the mode-matching properties introduced by the upper and/or lower block(s) (305, 310), the energy carried in the incident guided mode is better matched with the intersection mode (405). Additionally, the intersection mode (405) is better matched to the guided mode in the output waveguide. This reduces the mode discontinuities and greatly suppresses the scattering into the surrounding medium.

In sum, there has been an increasing demand for massively parallel photonic networks to be build on-chip in order to satisfy the interconnect requirements from the many-core chip design. As the on-chip dielectric waveguides are more densely placed and the chances of crossing each other increases, reducing the optical losses and the cross-talk at waveguide intersections becomes more and more important.

Forming an upper block and/or lower block over the intersection of a waveguide intersection significantly reduces the optical losses and cross-talk at the intersection. The upper and lower blocks can be efficiently formed using conventional lithographic processes. The blocks create well-confined guided eigenmodes within the intersection. As the thickness of the blocks increase, the field becomes more concentrated in the center of the intersection. The existence of such a guided mode provides much better mode matching with the incident guided mode at the entering and exiting boundaries of the intersection, so that the energy captured by the crossing waveguide (the cross-talk energy) is greatly reduced. The back reflections into the incident waveguide and scatterings into the surrounding medium generated by the intersection are also significantly reduced. By these means, the integrity of the optical signal is protected, and the energy loss from the incident optical signal at a waveguide intersection is greatly reduced.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A waveguide intersection comprising:
   an input waveguide and an output waveguide, said input waveguide for guiding optical energy in an incident guided mode toward said output waveguide;
   a crossing waveguide intersecting said input waveguide and said output waveguide to form said intersection, such that light will pass through a portion of said crossing waveguide to travel from said input waveguide to said output waveguide; and
   a block of material, said block being optically joined to said intersection such that a guided intersection mode is produced by said block within said crossing waveguide at said intersection that limits lateral spreading of said optical energy at said intersection.

2. The waveguide intersection of claim 1, further comprising optically joining said block to a bottom surface of said intersection such that said guided intersection mode is created within said intersection.

3. The waveguide intersection of claim 1, further comprising optically joining said block to an upper surface of said intersection such that said guided intersection mode is created within said intersection.

4. The waveguide intersection of claim 1, further comprising optically joining a first block to an upper surface of said intersection and a second block to a lower surface of said intersection.

5. The waveguide intersection of claim 1, wherein said block is a cuboid.

6. The waveguide intersection of claim 1, wherein said block substantially covers a planar surface of said intersection.

7. The waveguide intersection of claim 1, wherein said block has similar material properties as at least one of: said input waveguide, said output waveguide, and said crossing waveguide.

8. The waveguide intersection of claim 1, wherein said block provides substantially similar lateral confinement for optical energy entering said waveguide intersection from any one of: said input waveguide, said output waveguide, and said crossing waveguide.

9. A waveguide intersection with reduced losses comprising:
   a input waveguide and an output waveguide, said input waveguide and said output waveguide being collinear;
   a crossing waveguide intersecting said input waveguide and said output waveguide to form an intersection; said crossing waveguide being substantially perpendicular to said input waveguide and said output waveguide; and
   an upper block and a lower block, said upper block and said lower block having a substantially square footprint and covering said intersection, said upper block and said lower block being formed from material substantially similar to material used to form said input waveguide and said output waveguide;
   wherein said waveguide intersection is formed using a multi-layer nano-imprint mask.

10. A method of reducing optical losses within a waveguide intersection at which intersection at least two waveguides share a common space, said method comprising increasing a cross-sectional height of said intersection such that optical energy passing through said intersection is laterally confined.

11. The method of claim 10, further comprising increasing said cross-sectional height by optically joining at least one block to said waveguide intersection.

12. The method of claim 11, further comprising increasing said cross-sectional height by optically joining a first block to one side of said waveguide intersection and joining a second block to an opposite side of said waveguide intersection.

13. The method of claim 11, further comprising adjusting a height of said at least one block to achieve a desired amount of lateral confinement of said optical energy.

14. The method of claim 11, further comprising tuning a physical characteristic of said at least one block to minimize back reflections.

15. The method of claim 11, where said at least one block has substantially the same footprint as said intersection.

16. A waveguide intersection comprising:
   a first waveguide and a second waveguide each for transmitting optical energy in a guided mode, wherein said first and second waveguides have optical paths that cross at said intersection such that light will pass through a portion of said second waveguide when following said first waveguide through said intersection and vice versa; and
   a block of material located at said intersection that imposes a guided intersection mode on optical energy in said intersection, wherein said guided intersection mode limits lateral spreading of said optical energy at said intersection.

17. The waveguide intersection of clam 16, wherein:
said first waveguide comprises a first intersection plane where said first waveguide first intersects said second waveguide and a second intersection plane at an opposite boundary of said intersection from said first intersection plane, and
said first and second intersection planes are tuned so that back reflection from said first intersection plane will have an opposing amplitude and phase to back reflection from said second intersection plane such that back reflection from said first intersection plane will at least partially cancel through destructive interference back reflection from said second intersection plane.

18. The waveguide intersection of claim 16, wherein the block of material comprises a dielectric material.

19. The waveguide intersection of claim 16, wherein said intersection is sandwiched between said block of material and another block of material on an opposite side of said intersection.

20. The waveguide intersection of claim 16, wherein said block of material has an index of refraction higher than that of a surrounding medium, said index of refraction reducing back reflections generated at said intersection.

\* \* \* \* \*

UNITED STATES PATENT AND TRADEMARK OFFICE
CERTIFICATE OF CORRECTION

| | | |
|---|---|---|
| PATENT NO. | : 8,655,124 B2 | Page 1 of 1 |
| APPLICATION NO. | : 13/061449 | |
| DATED | : February 18, 2014 | |
| INVENTOR(S) | : David A. Fattal et al. | |

It is certified that error appears in the above-identified patent and that said Letters Patent is hereby corrected as shown below:

In the Claims:

In column 9, line 1, in Claim 17, delete "clam" and insert -- claim --, therefor.

Signed and Sealed this
Sixteenth Day of September, 2014

Michelle K. Lee
*Deputy Director of the United States Patent and Trademark Office*